Sept. 25, 1951  L. A. STENGEL  2,568,901
PROCESS FOR PRODUCING AMMONIUM NITRATE
Filed May 3, 1947
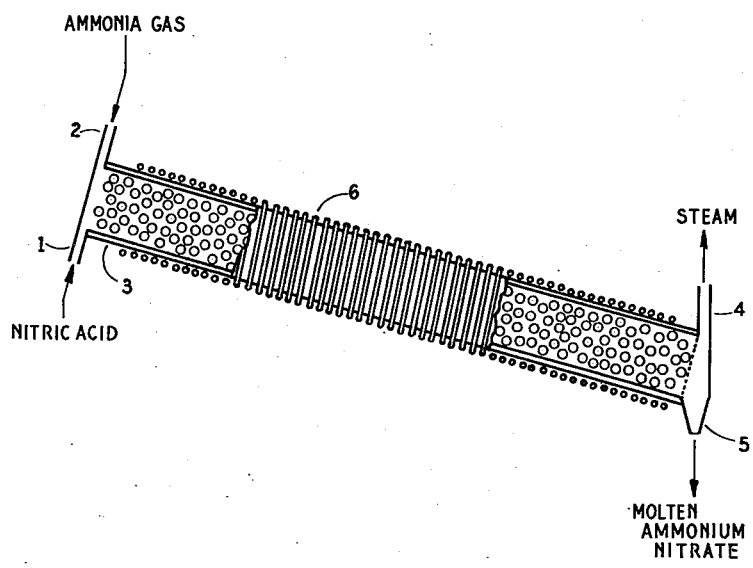
INVENTOR:
Leonard A. Stengel
BY Francis M. Crawford
ATTORNEY.

Patented Sept. 25, 1951

2,568,901

UNITED STATES PATENT OFFICE 2,568,901

PROCESS FOR PRODUCING AMMONIUM NITRATE

Leonard A. Stengel, Terre Haute, Ind., assignor to Commercial Solvents Corporation, Terre Haute, Ind., a corporation of Maryland Application May 3, 1947, Serial No. 745,729

5 Claims. (Cl. 23—103)

1

My invention relates to a new and useful single step process for the preparation of ammonium nitrate containing any desired water content. More particularly, it relates to a single step process for the preparation of substantially dry ammonium nitrate from ammonia and nitric acid solutions.

In the past the preparation of dry ammonium nitrate has been prepared by very involved and expensive processes which, moreover, are quite hazardous. These processes generally comprise a neutralizing step to produce an ammonium nitrate solution, followed by an evaporating step to remove sufficient water so that crystallization, flaking, graining, beading, prilling, or the like, can be accomplished. Most of the processes also involve a final drying step in order to reduce the moisture content of the ammonium nitrate to a few tenths of a percent. These operations are expensive, involving much equipment and the expenditure of large amounts of power and evaporation energy. Also, they are usually carried out in separate steps in the form of relatively small batches and the operations are scattered over a fairly wide area so as to reduce the hazard from explosions. Because of the tendency of ammonium nitrate to explode at or above its melting point, it has not previously been considered possible to prepare it on a commercial scale by the direct interaction of ammonia and nitric acid at elevated temperatures. My new process permits this to be done with a minimum of hazard.

The processes of manufacturing ammonium nitrate of the prior art are in general unsatisfactory for a number of reasons. Among the more important of these is that the reaction between ammonia and nitric acid is very highly exothermic and most, if not all of the heat, formed in the reaction, is lost. A second reason is that the evaporation of the water to prepare dry ammonium nitrate requires a large amount of heat, which is usually supplied from some source other than that produced in the reaction. In my improved single step process the reaction takes place substantially in the vapor phase and the evaporation of the water takes place in the same apparatus and substantially simultaneously, thus permitting the utilization of all of the heat of reaction for the evaporation of the water present, resulting in a substantial saving in the total heat used for the evaporation. Still another serious objection to the prior process is that the purity and water concentration of the final product could not be made uniform, the water content of the ammonium nitrate produced by this old process being generally of the order of between two and ten per cent. My new process takes advantage of the large amount of heat produced in the exothermic reaction involving the neutralization of nitric acid by ammonia for the evaporation of the water present, and by regulating the amount of additional heat supplied to the reactor I am able to control the water content of the final product and obtain a substantially dry product containing less than 0.2 per cent moisture. The separate step of evaporation of the ammonium nitrate solution to obtain a fairly dry product required in the prior art processes is accordingly dispensed with. Another advantage of my process is that the moisture content of the final product can be predetermined by regulating the concentration of the acid put through the reactor or by regulating the rate of passage of the mixture of acid and ammonia through the reactor. Also, the fact that the ammonium nitrate in my new process is obtained in the liquid state makes it easy to handle and on cooling gives a product of maximum density, thus reducing packaging costs.

My new process has still other important advantages over the prior art process. The reaction and evaporation operation both taking place in the same vessel, less equipment and less handling is required. And of utmost importance is the fact that relatively small amounts of material are in process at any given time, thus greatly reducing the hazards from explosions.

My process consists essentially in passing a mixture of approximately equimolecular proportions of nitric acid and ammonia under intimate contact conditions through a reactor tube maintained at a temperature ranging from about 180° to about 250° C. While this operation may be modified in a number of ways, it may, for example, be effected by mixing ammonia vapors, at a temperature of about 220°, with nitric acid of about 20 to 70 per cent strength previous to passing the mixture through the reactor tubes. I may, however, satisfactorily use nitric acid ranging in strength from 20% to 100% $HNO_3$ content.

The reactor should be constructed of a material not appreciably affected by nitric acid or ammonia in either the liquid or vapor form and may be of different sizes depending upon the desired capacity. With a reactor of $\frac{3}{16}$" ID and 36" long I have obtained 2½–5 pounds of substantially dry ammonium nitrate per hour. I have found that the process operates satisfactorily if the reactor is maintained in a vertical or inclined position but it is preferably placed in an inclined position. In either case the reactor (reaction zone) is free to drain at its lower end so that it is maintained substantially free from liquid reaction products. The reaction products are removed in two phases, one of which is substantially steam and the other of which is a molten ammonium nitrate the water content of which depends upon the temperature of the reaction zone. The required temperature is attained through the combined effect of the exothermic heat of reaction and added heat which may be supplied in a number of ways. For example, the ammonia vapor and/or nitric acid may be preheated or the heat may be added thru the reactor walls. A convenient method of accomplishing the latter is by means of a jacket surrounding the reactor and through which superheated steam or heated oil is passed, or an electrical heating coil may surround the reactor and the heating be accomplished by this means. The reactor operates best if it is filled or packed with glass beads, or glass or stainless steel Raschig rings, in order to afford a large surface for the reaction, thus assuring a rapid conversion of the water to steam and thereby insuring the production of the ammonium nitrate in a substantially dry form. In an arrangement such as the above, all of the heat of reaction is employed and the evaporation of the desired amount of water takes places simultaneously with the reaction with the result that the steam separates from the substantially dry molten ammonium nitrate.

One type apparatus suitable for carrying out my invention is illustrated in the accompanying drawing. A reactor tube 3 is provided with an inlet 2 for ammonia gas and an inlet 1 for nitric acid. The reactor 3 is preferably maintained in an inclined position, as shown, but can be in a vertical position. In the drawing the reactor tube 3 is shown as filled with glass beads, but any material such as glass or stainless steel Raschig rings may be used in order to afford a large surface for the reaction. To supplement the heat of reaction, the ammonia vapor and/or nitric acid may be preheated, or heat may be supplied in a number of other ways. For convenience, in the drawing the reactor tube is shown as wrapped with an electrical heating coil which supplies the additional heat. While the drawing shows nitric acid and ammonia gas entering at separate inlets, they can be premixed and enter as a mixture through either inlet 1 or inlet 2. In operation the reactants are fed through the inlets and ammonium nitrate and steam immediately form as separate phases. As the molten ammonium nitrate passes down reactor tube 3, over the glass beads, additional water is driven off. Steam is withdrawn through outlet 4 while molten ammonium nitrate flows through outlet 5.

My process may be operated at either atmospheric, elevated, or reduced pressures and the particular pressure employed appears to be relatively unimportant so long as it is sufficiently high to take care of the pressure drop thru the reactor. If intimate contact between the reactants is brought about by means of baffle plates, perforated plates, Raschig rings, etc., the pressure drop during operation is usually in the range of 1 to 10 pounds per sq. in., depending on the length of the reactor and other factors such as those just enumerated.

Regulation of the ratios of the reactants is not highly important so long as a large excess of one or the other of the reactants is not present, as the excess nitric acid or ammonia is flashed off from the molten ammonium nitrate leaving the reactor. Obviously, if too large an excess of a reactant is present it must be recovered to prevent the process from being uneconomical.

The temperature of the reactor and the time of contact of the reactants at a given temperature are highly important. For example, at a temperature above 200° C. decomposition occurs but at a very short contact time the loss of ammonium nitrate is negligible. Close to theoretical yields, however, can be obtained even at temperatures in the range of 250-275° C. if the contact time is shortened.

Ammonium nitrate may be produced according to my new process at temperatures ranging from 160° to 300° C. but I prefer to maintain the reactor at a temperature of about 180° to about 250° C. Temperatures below 180° C. generally result in a product containing some moisture while temperatures above 250° C. produce some degradation of product, forming nitrous oxide. These points are illustrated in the Table I when 62% $HNO_3$ was used.

TABLE I

| Run No. | Gms 100% $HNO_3$/min. | Temp. Reactor °C | Per Cent Acid Converted | Moisture in $NH_4NO_3$ Melt Per Cent |
|---|---|---|---|---|
| 173-E | 7.1 | 190 | 98.5 | 4.0 approx. |
| 173-F | 7.1 | 225 | 98.5 | 0.5 approx. |
| 173-G | 5.7 | 265 | 95.0 | 0.2 approx. |
| 173-H | 4.2 | 300 | 80.0 | 0.1 approx. |

The operation of my process is illustrated by the following examples but it should be understood that it is not limited to the specific operating conditions shown therein.

*Example I*

Vapors of 29.2% nitric acid at a temperature of about 250° C. were mixed with cold ammonia vapors in approximately molar ratios and the mixture passed downwardly thru an inclined Pyrex tube, 1" in diameter x 16" long, filled with 6 mm. glass beads and externally heated to a temperature of 240°-265° C. The rate of acid feed was about 3½ gms. 100% $HNO_3$ basis per minute. Molten substantially anhydrous ammonium nitrate was collected as it flowed from the tube. The conversion into ammonium nitrate on the basis of nitric acid was about 80%. The analysis of the product showed:

0.17% moisture
21.20% $NH_3$
77.67% $NO_3$
M. P.—166.0° C.

*Example II*

Cold liquid 56% nitric acid was mixed with ammonia vapors preheated to about 230° C. and the resulting mixture passed downwardly thru an inclined externally heated Pyrex tube, 1" in diameter x 42" long, filled with 4 mm. glass beads. The temperature at inlet of the reactor was maintained at about 180° C. and at the exit at about 220° C. The rate of acid feed was about 4 gms. 100% basis $HNO_3$ per minute. The ammonia flow was varied slightly so that part of the run was made using excess $NH_3$ and part using excess $HNO_3$. Conversion of the $HNO_3$ into $NH_4NO_3$ averaged about 88%.

Example III

This operation was a duplicate of Example II except that increased amounts of $HNO_3$ and $NH_3$ per unit of time were used, the rate of acid feed being about 8 gms. 100% $HNO_3$ per minute and the $NH_3$ being present in a very slight excess. The operation was conducted in such a manner that there was a 10″ water pressure drop thru the reactor, resulting in better contact and mixing of the reactants. The conversion of $HNO_3$ to molten substantially dry ammonium nitrate was 96% and the condensed steam collected contained 8 gms. $NO_3$ per 100 ml. The overall yield for the run showed 101% on basis of the $HNO_3$ used.

The ammonium nitrate leaving the reactor is in a molten substantially water-free form and may be treated in any desired manner, as for example, by flaking, beading, or prilling. Or, it may be cooled in lump or block form and subsequently crushed or milled, or otherwise treated in order to convert it into the desired form.

If, instead of substantially dry ammonium nitrate, a solution is desired such as, for example, a 65% to 75% solution of ammonium nitrate, this may also be conveniently obtained by my new process, the reaction being carried out exactly as above described except that the temperature is lowered sufficiently to prevent the evaporation of all the water. For example, to obtain a 65% to 75% ammonium nitrate solution, nitric acid of about 60% concentration and ammonia vapor both at atmospheric temperature are combined in approximately molar ratio in the apparatus described in Example I, without the application of any exterior heat, and the resulting aqueous reaction product collected.

Now having described my invention, what I claim is:

1. A one-step process for producing ammonium nitrate containing regulated amounts of water, which comprises continuously reacting, at a temperature of from about 160° to 300° C., ammonia vapors with nitric acid in a reaction zone which is filled with inert packing materials serving to increase the surface contact area and which is free to drain at its lower end so that the zone is maintained substantially free from liquid reaction products, and removing reaction products from said reaction zone as rapidly as possible in two phases, one of which is substantially steam and the other of which is a molten ammonium nitrate the water content of which depends upon the temperature of the reaction zone.

2. The process of claim 1 wherein the ammonia and nitric acid are introduced at the upper end of said reaction zone in substantially equimolecular proportions.

3. The process of claim 1 wherein the ammonia and nitric acid are mixed before introducing them into said reaction zone.

4. The process of claim 1 wherein the reaction zone is maintained within the narrower temperature range of from about 180° to 250° C. to produce a substantially anhydrous ammonium nitrate.

5. The process of claim 1 wherein said reaction zone is downwardly inclined and the ammonia and nitric acid are introduced at the top and the reaction products are removed at the lower end of said zone.

LEONARD A. STENGEL.

REFERENCES CITED

The following references are of record in the file of this patent:

UNITED STATES PATENTS

| Number | Name | Date |
|---|---|---|
| 1,811,712 | Boyd | June 23, 1931 |
| 2,089,957 | Harris | Aug. 17, 1937 |

FOREIGN PATENTS

| Number | Country | Date |
|---|---|---|
| 6,048 | Great Britain | of 1915 |

OTHER REFERENCES

Mellor, "Treatise on Inorganic Chemistry," vol. 2, page 837. London, Longmans, Green & Co., 1922.

Perry, "Chemical Engineers' Handbook," 2nd Ed., page 315. New York, McGraw-Hill Pub. Co., 1941.